Patented Apr. 6, 1943

2,315,839

UNITED STATES PATENT OFFICE 2,315,839

CATALYTIC TREATMENT OF NON-BENZENOID HYDROCARBONS

Robert E. Burk and Everett C. Hughes, Cleveland Heights, Ohio, assignors to The Standard Oil Company, Cleveland, Ohio, a corporation of Ohio No Drawing. Application June 10, 1940, Serial No. 339,760

10 Claims. (Cl. 260—668)

It is known to subject crude naphtha to the action of a catalyst and re-circulate the hydrogen gas which is formed in the process, high pressures being maintained, a prevalent opinion in the industry being that more effective results in reforming a naphtha are had the higher the pressure, other things equal. In our application Serial No. 262,492 we have pointed out that in catalysts containing oxides of chromium and aluminum there is a peculiar critical proportion, giving a disproportionately high action where the chromium is in the sharp range 18–30 mol per cent. We have now found further that where such very critical catalyst is operated with naphtha in the presence of hydrogen or hydrogen-rich off-gas formed in the process there is surprisingly a certain critical pressure which should be adopted, quite in contrast to prior conditions in the industry.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

A hydrocarbon to be treated may be of desired non-benzenoid character, as aliphatic hydrocarbons of paraffins and olefines and naphthenic hydrocarbons or their mixtures, naphthas, distillates, etc. The preferred catalyst is a gel type oxide catalyst containing 18–30 mol per cent chromium oxide and 82–70 mol per cent of aluminum oxide. In some instances small amounts of other oxides such as copper etc., may be present. The range of the chromium is critical, the high peak of action being at about 20 mol per cent. The catalyst is arranged in the treating chamber as desired, but preferably we place it in a series of superposed spaced trays or bodies, such that the hydrocarbon to be treated can be passed through these serially. The catalytic reaction from the hydrocarbon requires heat, and in the present process we prefer to provide this by means which also at the same time gives other particular benefits in conjunction. A fraction of the un-condensed off-gas turned out by the catalytic zone is returned in such amount as desirable in any given instance, and such hot gas supplied to the catalytic zone correspondingly contributes heat, and the gas may be fed in at the intake feed. The hydrocarbons to be treated, are preferably introduced to at least a part, or all of the bodies or trays of catalyst. Thus, with a suitable controlled feed there to the respective bodies or trays, these may be individually supplied as desired with highly superheated gas, equalizing and controlling the temperature requirements at the different portions of the chamber. As indicated, there is a special pressure range which we have found critical, viz. the total gas pressure in the catalytic chamber should be controlled closely to between 40 and 180 pounds per square inch, and notably best at about 100 pounds per square inch. Variation outside of such limits results in lower efficiency as regards reaction and coke formation on catalyst surfaces. We employ high temperatures in the catalyst zone, preferably slightly higher than without recirculation of gas or higher than ordinarily used in aromatization. Temperatures of 800–1200° F. are applicable. The flow rates of non-benzenoid hydrocarbon treated, naphtha, etc., may be 0.1–10 liquid volumes per volume of catalyst per hour. At the higher temperatures the shorter contact times may be used.

For instance, a crude naphtha having a Kattwinkel analysis of 19 per cent, vaporized and passed, with a fraction of the off-gas returned from the process, in contact with an 80:20 aluminum:chromium oxide gel catalyst at 960° F., and 100 pounds total gas pressure in the catalyst chamber, yields a gasoline product of 42 Kattwinkel, and the coke formed on the catalyst is 0.314 per cent. The Kattwinkel number is the per cent absorption in sulphuric acid, as described for instance in Brennstoff Chemie 8, 353, (1927). Operating with the same conditions except that the temperature is for instance 1010° F., the product shows 52 Kattwinkel, and the coke 0.62. If operation be carried on with a pressure of 200 pounds, the aromatic content of the product for a given yield is very much lower. Thus, with a pressure of 200 pounds and operating temperature corresponding to that first noted above, the product shows only 31 Kattwinkel rating. At 200 pounds there is a greater amount of cracking and consequent gas loss as compared with operation at 100 pounds. Peculiarly also, on the other hand if the pressure be low, more coke is formed than at 100 pounds pressure. It is thus emphasized that a very critical pressure condition is to be observed in operating a recirculation of hydrogen with our highly active critical composition of catalyst. With a less active catalyst such as deposited chromium oxide on a support of alumina or bauxite the necessary operating temperature is so high that all hydrogen pressures obscure the bearing of possible pressure differences.

The liquid product formed by the catalyst treatment may be extracted with a selective solvent if desired, as for instance liquid sulphur dioxide, high boiling amines, phenols, etc., and combinations, and the non-benzenoid portion may be re-contacted with the catalyst. The gases formed may be returned in whole or part. The catalyst is regenerated in situ at 750-1200° F. by an oxygen-containing gas such as air or oxygen diluted with for instance nitrogen.

Other modes of applying the principle of the invention may be employed, change being made as regards the details described, provided the features stated in any of the following claims, or the equivalent of such, be employed.

We therefore particularly point out and distinctly claim as our invention:

1. A process of forming aromatic hydrocarbons, which comprises maintaining at high temperature a series of bodies of a gel type contact mass containing 18-30 mol per cent of chromium oxide and 82-70 mol per cent of aluminum oxide, and passing through the series a non-benzenoid hydrocarbon of gasoline range, while returning a portion of off-gas from the process to at least a part of the series of bodies of contact mass, and controlling the total gas pressure during contacting at about 100 pounds per square inch.

2. A process of forming aromatic hydrocarbons, which comprises maintaining at high temperature a series of bodies of a gel type contact mass containing 18-30 mol per cent of chromium oxide and 82-70 mol per cent of aluminum oxide, and passing through the series a non-benzenoid hydrocarbon of gasoline range, while adding heat to at least a part of the series of bodies of contact mass by supplying thereto a hot portion of off-gas from the process, and controlling the total gas pressure during the contacting at about 100 pounds per square inch.

3. A process of forming aromatic hydrocarbons, which comprises maintaining at high temperature a gel type contact mass containing 18-30 mol per cent of chromium oxide and 82-70 mol per cent of aluminum oxide, and subjecting gasoline vapor to the action thereof with a returned portion of the off-gas from the process, while controlling the total gas pressure during the contacting at about 100 pounds per square inch.

4. A process of forming aromatic hydrocarbons, which comprises maintaining at high temperature a gel type contact mass containing 18-30 mol per cent of chromium oxide and 82-70 mol per cent of aluminum oxide, and subjecting to the action thereof a non-benzenoid hydrocarbon of gasoline range with a returned portion of the off-gas from the process, while controlling the total gas pressure during the contacting at about 100 pounds per square inch.

5. A process of forming aromatic hydrocarbons, which comprises maintaining at high temperature a series of bodies of a gel type contact mass containing 18-30 mol per cent of chromium oxide and 82-70 mol per cent of aluminum oxide, and passing through the series a non-benzenoid hydrocarbon of gasoline range, while returning a portion of the off-gas from the process to at least a part of the series of bodies of contact mass, and controlling the total gas pressure during contacting at 40-180 pounds per square inch.

6. A process of forming aromatic hydrocarbons, which comprises maintaining at high temperature a series of bodies of a gel type contact mass containing 18-30 mol per cent of chromium oxide and 82-70 mol per cent of aluminum oxide, and passing through the series a non-benzenoid hydrocarbon of gasoline range while adding heat to at least a part of the series of bodies of contact mass by supplying thereto a hot portion of the off-gas from the process, and controlling the total gas pressure during the contacting at 40-180 pounds per square inch.

7. A process of forming aromatic hydrocarbons, which comprises maintaining at high temperature a gel type contact mass containing 18-30 mol per cent of chromium oxide and 82-70 mol per cent of aluminum oxide, and subjecting gasoline vapor to the action thereof with a returned portion of the off-gas from the process, while controlling the total gas pressure during the contacting at 40-180 pounds per square inch.

8. A process of forming aromatic hydrocarbons, which comprises maintaining at high temperature a gel type contact mass containing 18-30 mol per cent of chromium oxide and 82-70 mol per cent of aluminum oxide, and subjecting to the action thereof a non-benzenoid hydrocarbon of gasoline range and hydrogen, while controlling the total gas pressure during the contacting at 40-180 pounds per square inch.

9. A process of forming aromatic hydrocarbons, which comprises maintaining at high temperature a series of bodies of a gel type contact mass containing 18-30 mol per cent of chromium oxide and 82-70 mol per cent of aluminum oxide, passing naphtha through the series, while adding heat to at least a part of the series of bodies of contact mass by supplying thereto a hot portion of the off-gas from the process, and controlling the total gas pressure during the contacting at 40-180 pounds per square inch.

10. A process of forming aromatic hydrocarbons, which comprises maintaining at high temperature a gel type contact mass containing 18-30 mol per cent of chromium oxide and 82-70 mol per cent of aluminum oxide, and subjecting to the action thereof a naphtha with a returned portion of the off-gas from the process, while controlling the total gas pressure during the contacting at 40-180 pounds per square inch.

ROBERT E. BURK.
EVERETT C. HUGHES.